United States Patent
Kirsner et al.

(10) Patent No.: US 7,008,907 B2
(45) Date of Patent: *Mar. 7, 2006

(54) ADDITIVE FOR OIL-BASED DRILLING FLUIDS

(75) Inventors: Jeff Kirsner, Humble, TX (US); Jeff Miller, Tomball, TX (US); Jon Bracken, New Waverly, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 305 days.

This patent is subject to a terminal disclaimer.

(21) Appl. No.: 10/611,009

(22) Filed: Jul. 1, 2003

(65) Prior Publication Data

US 2005/0037929 A1 Feb. 17, 2005

Related U.S. Application Data

(63) Continuation-in-part of application No. 09/999,799, filed on Oct. 31, 2001, now Pat. No. 6,620,770.

(51) Int. Cl.
C09K 7/06 (2006.01)

(52) U.S. Cl. .............. 507/137; 507/117; 507/129; 507/131; 507/103; 507/140; 507/145

(58) Field of Classification Search ......... 507/103, 507/117, 128, 129, 131, 137, 140, 145
See application file for complete search history.

(56) References Cited

U.S. PATENT DOCUMENTS

| | | |
|---|---|---|
| 2,816,073 A | 12/1957 | Stratton |
| 3,684,012 A | 8/1972 | Scheffel et al. |
| 3,878,117 A | 4/1975 | Williams et al. |
| 3,912,683 A | 10/1975 | O'Farrell |
| 3,954,627 A | 5/1976 | Dreher et al. |
| 4,007,149 A | 2/1977 | Burton et al. |
| 4,012,329 A | 3/1977 | Hayes et al. |

(Continued)

FOREIGN PATENT DOCUMENTS

EP 0 124 194 A2 11/1984

(Continued)

OTHER PUBLICATIONS

J.E. Friedheim, Second-Generation Synthetic Drilling Fluids, Journal of Petroleum Technology, Jul. 1997, pp. 724-728.

(Continued)

Primary Examiner—Philip C. Tucker
(74) Attorney, Agent, or Firm—Craig W. Roddy; Karen B. Tripp

(57) ABSTRACT

A method and product is disclosed which provides emulsion stability and filtration control to invert emulsion drilling fluids. The product comprises a blend of a carboxylic acid terminated polyamide and/or a wetting agent with a reaction product or mixture produced by the Diels-Alder reaction of dienophiles, preferably carboxylic acids, polycarboxylic acids, acid anhydrides, or combinations or mixes thereof, with a mixture of fatty acids and resin acids. The product of the invention is extremely effective, decreasing by about two-thirds the amount of emulsifier generally required to formulate an effective drilling fluid. The product of the invention also greatly reduces and in many cases eliminates the need for conventional fluid loss additives, and additionally provides electrical stability. Moreover, the product of the invention has a pour point as low as about 20 degrees Fahrenheit with minimal solvents, thereby eliminating the need to ship large amounts of inert material for use, and may be transported in a highly active state.

66 Claims, 1 Drawing Sheet

U.S. PATENT DOCUMENTS

| | | | |
|---|---|---|---|
| 4,148,821 A | 4/1979 | Nussbaum et al. | |
| 4,153,588 A | 5/1979 | Makowski et al. | |
| 4,390,474 A | 6/1983 | Nussbaum et al. | |
| 4,425,462 A | 1/1984 | Turner et al. | |
| 4,447,338 A | 5/1984 | Lundberg et al. | |
| 4,508,628 A | 4/1985 | Walker et al. | |
| 4,552,215 A | 11/1985 | Almond et al. | |
| 4,553,601 A | 11/1985 | Almond et al. | |
| 4,671,883 A | 6/1987 | Connell et al. | |
| 4,787,990 A | 11/1988 | Boyd | |
| 4,802,998 A | 2/1989 | Mueller et al. | |
| 4,810,355 A | 3/1989 | Hopkins | |
| 4,900,456 A | 2/1990 | Ogilvy | |
| 4,964,615 A | 10/1990 | Mueller et al. | |
| 5,045,219 A | 9/1991 | Trahan et al. | |
| 5,053,534 A * | 10/1991 | Cosgrove | 562/509 |
| 5,096,883 A | 3/1992 | Mercer et al. | |
| 5,106,516 A | 4/1992 | Mueller et al. | |
| 5,182,326 A * | 1/1993 | LeBlanc et al. | 524/514 |
| 5,189,012 A | 2/1993 | Patel et al. | |
| 5,194,640 A * | 3/1993 | Cosgrove et al. | 554/126 |
| 5,232,910 A | 8/1993 | Mueller et al. | |
| 5,237,080 A | 8/1993 | Daute et al. | |
| 5,252,531 A | 10/1993 | Yasuda | |
| 5,252,554 A | 10/1993 | Mueller et al. | |
| 5,260,268 A | 11/1993 | Forsberg et al. | |
| 5,308,401 A | 5/1994 | Geke et al. | |
| 5,318,954 A | 6/1994 | Mueller et al. | |
| 5,318,955 A | 6/1994 | Mueller et al. | |
| 5,318,956 A | 6/1994 | Mueller et al. | |
| 5,330,662 A | 7/1994 | Jahnke et al. | |
| 5,333,698 A | 8/1994 | Van Slyke | |
| 5,403,508 A | 4/1995 | Reng et al. | |
| 5,403,822 A | 4/1995 | Mueller et al. | |
| 5,432,152 A | 7/1995 | Dawson et al. | |
| 5,441,927 A | 8/1995 | Mueller et al. | |
| 5,498,596 A | 3/1996 | Ashjian et al. | |
| 5,508,258 A | 4/1996 | Mueller et al. | |
| 5,569,642 A | 10/1996 | Lin | |
| 5,589,442 A | 12/1996 | Gee et al. | |
| 5,593,954 A | 1/1997 | Malchow, Jr. | |
| 5,607,901 A | 3/1997 | Toups, Jr. et al. | |
| 5,635,457 A | 6/1997 | Van Slyke | |
| 5,744,677 A | 4/1998 | Wu | |
| 5,837,655 A | 11/1998 | Halliday et al. | |
| 5,846,913 A | 12/1998 | Sawdon | |
| 5,849,974 A | 12/1998 | Clarembeau et al. | |
| RE36,066 E | 1/1999 | Mueller et al. | |
| 5,869,434 A | 2/1999 | Mueller et al. | |
| 5,877,378 A | 3/1999 | Overstreet et al. | |
| 5,909,779 A | 6/1999 | Patel et al. | |
| 5,929,297 A | 7/1999 | Theriot et al. | |
| 5,958,845 A | 9/1999 | Van Slyke | |
| 6,001,790 A | 12/1999 | Schmitt et al. | |
| 6,022,833 A | 2/2000 | Mueller et al. | |
| 6,034,037 A | 3/2000 | Van Slyke | |
| 6,090,754 A | 7/2000 | Chan et al. | |
| 6,107,255 A | 8/2000 | Van Slyke | |
| 6,110,874 A | 8/2000 | Van Slyke | |
| 6,211,119 B1 | 4/2001 | Herold et al. | |
| 6,620,770 B1 * | 9/2003 | Kirsner et al. | 507/131 |
| 2004/0059032 A1 * | 3/2004 | He | 524/284 |
| 2004/0171727 A1 * | 9/2004 | Winters et al. | 524/270 |

FOREIGN PATENT DOCUMENTS

| | | |
|---|---|---|
| EP | 0 247 801 A2 | 12/1987 |
| EP | 0 254 412 B1 | 1/1988 |
| EP | 0 561 608 A2 | 9/1993 |
| GB | 2 166 782 A | 5/1986 |
| GB | 2 309 240 A | 7/1987 |
| GB | 2 212 192 A | 7/1989 |
| WO | WO 83/02949 A1 | 2/1983 |
| WO | WO 83/02949 A1 | 9/1983 |
| WO | WO 93/23491 A1 | 11/1993 |
| WO | WO 94/16030 A1 | 7/1994 |
| WO | WO 95/06694 A1 | 3/1995 |
| WO | WO 95/09215 A1 | 4/1995 |
| WO | WO 95/21225 A1 | 8/1995 |
| WO | WO 98/18882 A1 | 5/1998 |
| WO | WO 99/50370 A1 | 10/1999 |
| WO | WO 00/71241 A1 | 11/2000 |

OTHER PUBLICATIONS

Chapter 13, Synthetics, Baroid Fluids Handbook, pp. 13-1-13-27 (Rev. Aug. 1, 1997).

P.A. Boyd, D.L. Whitfill, T.S. Carter, J.P. Alamon, New Base Oil Used in Low-Toxicity Oil Muds, SPE No. 12119, 14 J Petroleum Technology, 1985, pp. 937-942.

\* cited by examiner

ADDITIVE FOR OIL-BASED DRILLING FLUIDS

RELATED APPLICATION

This application is a continuation-in-part of U.S. patent application Ser. No. 09/999,799, filed Oct. 31, 2001 now U.S. Pat. No. 6,620,770.

BACKGROUND OF THE INVENTION

1. Field of the Invention

The present invention relates to methods for drilling boreholes in subterranean formations, particularly hydrocarbon bearing formations, and to drilling fluids for use in such drilling operations. More particularly, the present invention relates to oil or synthetic based drilling fluids, fluids comprising invert emulsions, and more particularly drilling fluid additives that facilitate or enhance emulsification, electrical stability or filtration properties of the drilling fluid.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic-based muds, or invert emulsions, are normally used to drill swelling or sloughing shales, salt, gypsum, anhydrite or other evaporite formations, hydrogen sulfide-containing formations, and hot (greater than about 300 degrees Fahrenheit) holes, but may be used in other holes penetrating a subterranean formation as well. These non-aqueous based drilling fluids typically contain oil or a synthetic oil or other synthetic material or synthetic fluid ("synthetic") as the continuous phase and may also contain water which is dispersed in the continuous phase by emulsification so that there is no distinct layer of water in the fluid. The term "oil mud" or "oil or synthetic-based mud" typically means an invert oil or synthetic mud emulsion or invert emulsion. An all oil mud simply comprises 100% oil by volume as the liquid phase; that is, there is no aqueous internal phase. An invert emulsion drilling fluid may commonly comprise between about 50:50 to 95:5 by volume oil phase to water phase.

Most commonly, invert emulsions used in drilling typically comprise: a base oil or synthetic fluid for the external phase; a saline, aqueous solution for the internal phase (typically a solution comprising about 30% calcium chloride); and other agents or additives for suspension, fluid loss, density, oil-wetting, emulsification, filtration, and rheology control. With space at some well sites limited, such as on offshore platforms, and with increasing costs of transport of materials to a wellsite, there is industry-wide interest in, and on-going need for, more efficient and concentrated drilling fluid additives and for drilling fluids which can be formulated and maintained with minimal or fewer additives than common with prior art drilling fluids.

SUMMARY OF THE INVENTION

An improved and more efficient material or product and method is disclosed for providing emulsion stability and filtration control to invert emulsions and other oil or synthetic based drilling fluids for use in drilling boreholes in subterranean formations, particularly hydrocarbon bearing formations.

The product of the invention has the advantage of a pour point at temperatures as low as about 20 degrees Fahrenheit with minimal solvent. Thus, the product of the invention may be transported in a highly (about 90% to about 100%) active state, which reduces the need to inventory products containing different solvents for compatibility with the drilling fluid. This advantage further eliminates the need for shipping large amounts of inert material. Moreover, the product of the invention has the further advantage of providing high levels of filtration control to a drilling fluid made with conventional emulsifiers, especially at temperatures up to about 250° F. Still further, the product of this invention, when added to drilling fluids, reduces or eliminates the need for conventional fluid loss additives.

The product of this invention comprises two primary components or parts. One part is a carboxylic acid-terminated polyamide and/or a wetting agent and the other part is itself a mixture produced by the Diels-Alder reaction of dienophiles, preferably carboxylic acids, polycarboxylic acids, acid anhydrides, or combinations or mixes thereof, with a mixture of fatty acids and resin acids. These two components or parts are blended or mixed and further reacted with cations to form soaps. This blending or mixing and this saponification reaction may be achieved in the manufacturing process or it may be effected "in situ" by the presence of or addition of cations to the drilling fluid. As used herein, the term "in situ" shall be understood to mean in the drilling fluid. Typically, such blending and the saponification reaction will occur in the drilling fluid when the drilling fluid is being prepared for use as a drilling fluid or when the drilling fluid is in use as a drilling fluid in drilling a borehole in a subterranean formation. Drilling fluids commonly comprise cations. Sources of such cations include, without limitation, lime, quicklime, and calcium chloride, among others. Further, drilling fluids may incorporate cations contacted in or available from the subterranean formation itself.

The method of the invention employs the product of the invention for improved drilling fluids and improved drilling of boreholes in subterranean formations.

DETAILED DESCRIPTION OF PREFERRED EMBODIMENTS

Figure 1:
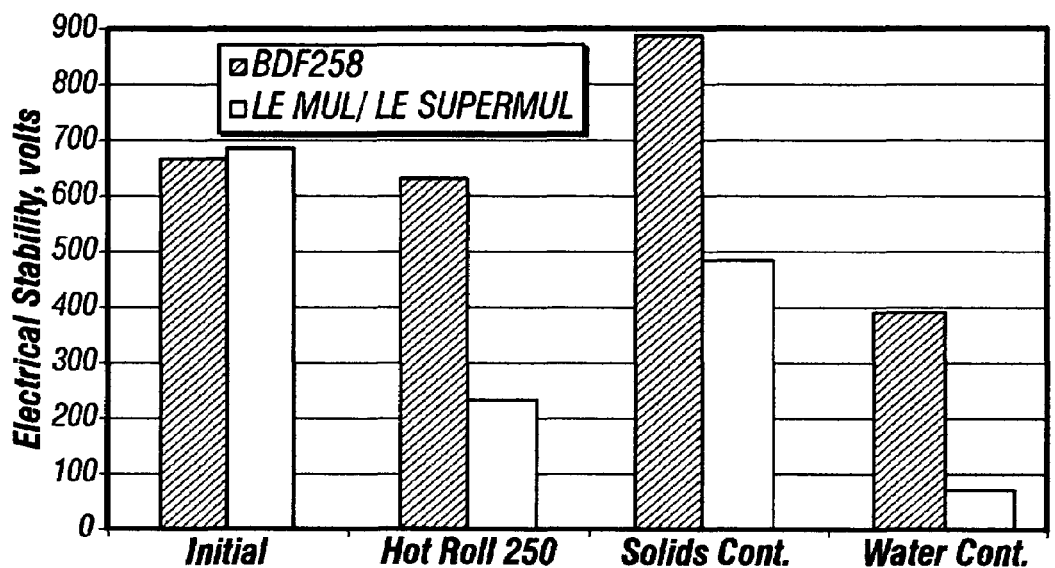
FIG. 1 is a graph comparing the electrical stability of a synthetic based drilling fluid containing the product of the invention with the same synthetic based drilling fluid containing conventional emulsifiers instead of the product of the invention, using data from Tables 1 and 2.

The product of the invention comprises a blend, mixture, or a combination (hereinafter "blend") of: (1) a carboxylic acid-terminated polyamide and/or a wetting agent ("Component 'A'"); and (2) a mixture or reaction product ("Component 'B'") produced by the Diels-Alder reaction of dienophiles, preferably carboxylic acids, polycarboxylic acids, and anhydrides, or combinations or mixes thereof, with a mixture of fatty acids and resin acids. Component B has a ratio of fatty acids to resin acids preferably ranging from about 4:1 to about 1:1 and a most preferred ratio of about 2:1 and is preferably comprised of fatty acids and resin acids derived from the distillation of crude tall oil.

When a carboxylic acid terminated amide is used as Component A, it is preferably concentrated (i.e., about 90% active), and typically made from the condensation reaction between fatty acids and polyamines. The fatty acids and polyamines are reacted in such proportion as to create a "partial amide" intermediate product having a mole ratio of the reactive acid sites to amine sites ranges from about 0.5:1 to about 0.75:1 and most preferably about 0.6:1. This partial amide intermediate product is diluted with a minimum amount of solvent, as needed for further processing, and the remaining amine sites are further reacted with an acid anhydride or polycarboxylic acid to produce the carboxylic acid-terminated polyamide. A most preferred carboxylic acid-terminated fatty polyamide for use in the invention is EZ-MUL® NT CONCENTRATE, the active constituent of EZ-MUL® NT available from Halliburton Energy Services, Inc. in Houston, Tex., although other carboxylic acid terminated fatty polyamides are believed to be useable.

Any wetting agent that provides a wetting function in a drilling fluid and preferably that is environmentally acceptable for use in a drilling fluid may be substituted for, or added to, the carboxylic acid terminated amide as Component A in the blend comprising the product of the invention. Examples of such wetting agents include, without limitation, quaternary ammonium salt, lecithin, and sodium dodecylbenzene sulfonate.

In comprising the product of the invention, the preferred ratio of Component A to Component B is about 1:5 to about 1:1. Ratios of Component A to Component B of about 1:2 to about 1:3 are most preferred. The exact ratio of these two components or parts may vary greatly depending on the exact desired characteristics of the product. Preferably, however, the quantity of Component B will exceed the quantity of Component A.

The blend comprising the product of the invention is preferably made by blending, mixing, or combining these two components—the polyamide and/or wetting agent, and the Diels-Alder modified fatty acid/resin acid mixture or reaction product—together. After blending, the polyamide and/or wetting agent, and the fatty acid/resin acid components, are reacted with cations to form soaps. The polyamide (if present) may undergo some saponification along with or as well as the fatty acid/resin acids. Such blending and saponification may be achieved as part of the manufacturing process of the product of the invention or may be effected in situ the drilling fluid by the presence or addition of cations to the drilling fluid. Calcium cations are preferred and may be obtained, for example, by reacting the modified fatty acid/resin acid component with lime, quicklime, or calcium chloride. The blending in the drilling fluid may occur when the drilling fluid is prepared, when the drilling fluid is at the well surface, or after the drilling fluid has been pumped into the wellbore. When blending in the wellbore, the components may be added to the drilling fluid separately or together.

Tall oil is a commonly known product made from acid treatment of alkaline liquors obtained from the manufacture of wood pulp, and tall oil and its derivatives have previously been used in oil-well drilling muds. However, the modified fatty acid/resin acid component of the blend of the product of the invention alone is not effective for achieving the advantages of the invention. EZ-MUL® is known to have utility as an emulsifier for oil based drilling fluids. However, carboxylic acid-terminated fatty polyamides alone cannot achieve all of the advantages of the invention. In the combination disclosed, however, the blend (or mixture) comprising the product of the invention provides a marked advance in the art.

Similarly, wetting agents are known to have utility in oil-based drilling fluids. However, wetting agents alone cannot achieve all of the advantages of the product of the invention. In the combination disclosed, however, the blend comprising the product of the invention provides superior performance.

The product of the invention is a powerfully efficient additive for oil or synthetic based drilling fluids, affording or effecting enhanced emulsification, and improved electrical stability and fluid loss control, with significantly less volume of additive than previously known or available with prior art drilling fluid additives. The product effects or helps facilitate emulsification typically in amounts of about one-third the quantity commonly needed for emulsification of oil or synthetic based fluids with prior art emulsifiers. That is, amounts of about three pounds to about five pounds of the product of the invention per barrel of drilling fluid can be effective for emulsification. Even lower quantities can improve the electrical stability and filtration control of drilling fluids, even if already emulsified with other emulsifiers.

The product of the invention does not rely on a carrier. The material comprising the product is highly active and is believed to be useful with all or substantially all synthetic and oil-based systems known to be effective for drilling fluids. The product of the invention may also add viscosity to the drilling fluid and thus is preferably added to the base drilling fluid before any weighting agents such as barite, for example, are added.

The product of this invention is stable even at temperatures up to (and including) about 250 degrees Fahrenheit without filtration additives and up to about 300 degrees to about 350 degrees Fahrenheit with filtration additives. Combining a wetting agent with a carboxylic acid-terminated polyamide as Component A may improve the Theological stability of the product of the invention at temperatures up to about 300° F. Using both a wetting agent and a carboxylic acid terminated amide as Component A, along with Component B, to comprise the product of the invention in an emulsifier package may also improve the oil-wetting nature of the drilling fluid in some base oils or synthetics and/or at certain reservoir conditions. For example, in a hostile or difficult offshore environment, a particular drilling fluid comprising the product of the invention might show enhanced performance upon addition of a wetting agent to the product of the invention, or more particularly or preferably to Component A, while the same drilling fluid in a different environment might show no improvement upon such addition of wetting agent.

The product of the invention has a high acid value. Consequently, improved results may be seen when a neutralizer or neutralizing agent is added to the drilling fluid. For example, a preferred maximum of about eight pounds of lime (or similar saponifying agent) might favorably be added per barrel of drilling fluid when about three pounds per barrel of the product of the invention are used in the drilling fluid. A preferred minimum amount of lime is about one-half pound per pound of the product of the invention. Additional lime (or similar saponifying agent) may be helpful or needed with larger quantities of product of the invention for optimum results, although satisfactory results might also be obtained with less.

Care is recommended when using the product of this invention to avoid over-treating. Excess emulsifiers (i.e., more than needed to effect emulsification) in drilling fluids can contribute to high fluid viscosity at cold temperatures (i.e., temperatures less than about 45 degrees Fahrenheit). For deepwater operations (i.e., use of drilling fluids at depths of water greater than about 500 feet and at temperatures less than about 45 degrees Fahrenheit), a wetting agent may preferably be used as Component A or added when Component A is a carboxylic acid-terminated amide to help maintain low riser viscosities as drill solids are incorporated in or become carried by the drilling fluid.

The method of the invention comprises adding the product of the invention to an oil or synthetic based drilling fluid or employing a drilling fluid comprising the product of the invention in drilling a borehole in a subterranean formation. In another embodiment, the method of the invention comprises adding the product of the invention to an oil or synthetic based drilling fluid to facilitate emulsification of the drilling fluid or the formation of invert emulsions.

Figure 2:
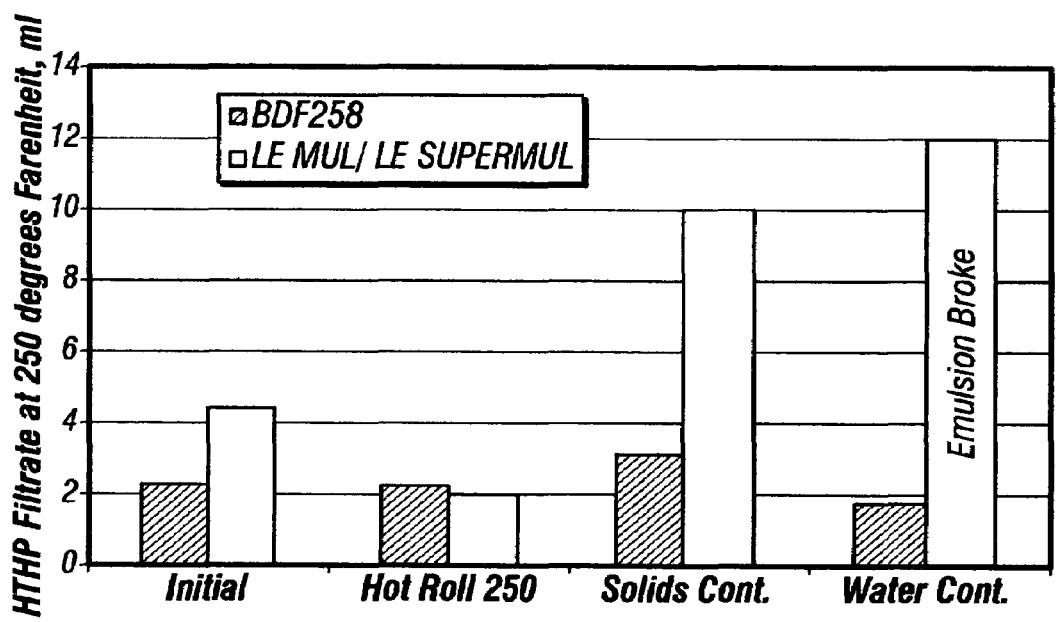
FIG. 2 is a graph comparing HTHP filtration of a synthetic based drilling fluid containing the product of the invention with the same synthetic based drilling fluid containing conventional emulsifiers instead of the product of the invention, using data from Tables 3 and 4.

Experiments were conducted that demonstrate or exemplify the invention. Several formulations of synthetic or oil-based drilling fluids were prepared, typical of those used in the field, and all of which comprised invert emulsions. Specifically, samples of drilling fluids were prepared comprising a synthetic or diesel oil base, to which additives were added, including the product of the invention or a known emulsifier for comparison, as indicated in Tables 1–13 below. The different samples were subjected to different conditions, such as high temperatures or hot rolling, or further additives or contaminants, for example, simulated drill solids or salt water, for comparison of performance and properties. The results of tests tabulated in Tables 1–4 are graphed in FIGS. 1 and 2.

As used in the tables, the following compounds or products have the meanings indicated below:

SF BASE™ is a synthetic oil base for drilling fluids typically used in drilling mud systems such as PETROFREE®SF, available from Halliburton Energy Services, Inc. in Houston Tex.;

LE BASE™ is a synthetic oil base for drilling fluids typically used in drilling mud systems such as PETROFREE® LE;

GELTONE® II, is an organoclay for improving viscosity characteristics;

SUSPENTONE® is an organoclay for improving the ability of a drilling fluid to suspend drill cuttings;

INVERMUL® is an emulsifier;

EZ MUL® is an emulsifier with a carboxylic acid terminated polyamide;

LE SUPERMUL® is an emulsifier with a carboxylic acid terminated polyamide;

LE MUL® is an emulsifier;

DRILTREAT™ is a wetting agent;

DEEP-TREAT™ is a wetting agent;

BAROID® is barite, a weighting agent;

DURATONE® HT is a filtration control agent;

BDF-257™ is Component B;

BDF-258™ is the product of the invention having Component B and a carboxylic acid terminated polyamide as Component A;

BD QUAT 2HT™ is dimethyl dihydrogenated tallow quaternary amine and chloride salt; and Rev Dust is material used to simulate drill solids.

All trademarks are the property of Halliburton Energy Services, Inc. and the products are available from Halliburton Energy Services, Inc. in Houston, Tex.

TABLE 1

PETROFREE ® SF
14 lb/gal; 75/25 OWR with 250,000 ppm WPS

| Sample Mark | A (7.33 lb/bbl Active emulsifier content) | | | | | | |
|---|---|---|---|---|---|---|---|
| SF BASE, bbl | 0.516 | | | | | | |
| Freshwater, bbl | 0.181 | | | | | | |
| GELTONE ® II, lb | 3 | | | | | | |
| SUSPENTONE ™, lb | 1 | | | | | | |
| LE ™ MUL, lb | 4 | | | | | | |
| LE ™ SUPERMUL, lb | 6 | | | | | | |
| Lime, lb | 5 | | | | | | |
| DURATONE ® HT, lb | 7 | | | | | | |
| BAROID ®, lb | 330 | | | | | | |
| Calcium chloride, lb | 21.9 | | | | | | |
| DEEP-TREAT ™, lb | 3 | | | | | | |

Mixed 15 minutes at 7000 rpm on a Silverson L4RT before testing; mixed 10 minutes after rolling

| | | | | | | | |
|---|---|---|---|---|---|---|---|
| Rev Dust, lb | — | | 45 | | — | | |
| 15% NaCl Brine Added, % vol | | | — | | 33 | | |
| Hot rolled @250° F., hr | — | | 16 | | 16 | | 16 |

| Temperature, ° F. | 120 | 40 | 120 | 40 | 120 | 40 | 120 |
|---|---|---|---|---|---|---|---|
| Plastic viscosity, cP | 23 | 80 | 24 | 112 | 37 | 108 | 38 |
| Yield point, lb/100 ft² | 15 | 18 | 8 | 19 | 8 | 26 | 11 |
| 10 Sec gel, lb/100 ft² | 8 | 7 | 6 | 10 | 7 | 9 | 6 |
| 10 Min gel, lb/100 ft² | 9 | 11 | 8 | 18 | 10 | 12 | 10 |
| Electrical stability, v | 690 | | 235 | | 488 | | 77 |
| HTHP filtrate @250° F., ml | 2.4 | | 2.4 | | 10.4 | | 7.6 (0.5 water) |
| Fann 35 dial readings | | | | | | | |
| 600 rpm | 61 | 178 | 56 | 243 | 82 | 242 | 87 |
| 300 rpm | 38 | 98 | 32 | 131 | 45 | 134 | 49 |
| 200 rpm | 29 | 69 | 24 | 91 | 33 | 94 | 36 |
| 100 rpm | 20 | 38 | 15 | 51 | 20 | 53 | 23 |
| 6 rpm | 7 | 7 | 5 | 10 | 5 | 10 | 7 |
| 3 rpm | 6 | 6 | 4 | 9 | 4 | 8 | 6 |

Note:
Contaminated samples were made up with mud already hot rolled 16 hr. @250° F.

TABLE 2

PETROFREE ® SF
14 lb/gal; 75/25 OWR with 250,000 ppm WPS

| Sample Mark | H3 |
|---|---|
| SF BASE, bbl | 0.516 |
| Freshwater, bbl | 0.181 |
| GELTONE ® II, lb | 3 |
| SUSPENTONE ™, lb | 1 |
| BDF-258, lb | 3 |
| Lime, lb | 8 |
| DURATONE ® HT, lb | 7 |
| BAROID ®, lb | 330 |
| Calcium chloride, lb | 21.9 |
| DEEP-TREAT ™, lb | 3 |

Mixed 15 minutes at 7000 rpm on a Silverson L4RT before testing; mixed 10 minutes after rolling

| | | | | | | | | | |
|---|---|---|---|---|---|---|---|---|---|
| Rev Dust, lb | — | | — | | 45 | | — | | |
| 15% NaCl Brine Added, % vol | | | — | | — | | 33 | | |
| Hot rolled @250° F., hr | — | | — | | 16 | | 16 | | 16 |
| Temperature, ° F. | 120 | 40 | 120 | 40 | 120 | 40 | 120 | 40 | 120 |
| Plastic viscosity, cP | 29 | 78 | 27 | 72 | 26 | N/A | 49 | 113 | 43 |
| Yield point, lb/100 ft$^2$ | 16 | 33 | 14 | 24 | 12 | N/A | 24 | 43 | 20 |
| 10 Sec gel, lb/100 ft$^2$ | 8 | 15 | 7 | 13 | 7 | 27 | 16 | 19 | 13 |
| 10 Min gel, lb/100 ft$^2$ | 10 | 17 | 9 | 15 | 9 | 57 | 36 | 20 | 13 |
| Electrical stability, v | 638 | | 669 | | 630 | | 884 | | 393 |
| HTHP filtrate @250° F., ml | | | 2.0 | | 1.6 | | 5.2 | | 2.4 |
| Fann 35 dial readings | | | | | | | | | |
| 600 rpm | 74 | 189 | 68 | 168 | 64 | O/S | 122 | 269 | 106 |
| 300 rpm | 45 | 111 | 41 | 96 | 38 | 186 | 73 | 156 | 63 |
| 200 rpm | 35 | 82 | 32 | 72 | 30 | 139 | 56 | 116 | 48 |
| 100 rpm | 24 | 53 | 22 | 45 | 20 | 88 | 38 | 72 | 32 |
| 6 rpm | 9 | 17 | 8 | 14 | 8 | 29 | 15 | 21 | 12 |
| 3 rpm | 8 | 15 | 7 | 12 | 7 | 26 | 14 | 19 | 11 |

Note:
O/S indicates an off-scale reading or >300. Contaminated samples were made up with mud already rolled 16 hr @250° F.

TABLE 3

PETROFREE ® LE
14 lb/gal; 75/25 OWR with 250,000 ppm WPS

| Sample Mark | C |
|---|---|
| LE BASE, bbl | 0.5094 |
| Freshwater, bbl | 0.1793 |
| GELTONE ® II, lb | 3.5 |
| SUSPENTONE ™, lb | 2 |
| LE ™ MUL, lb | 7 |
| LE ™ SUPERMUL, lb | 4 |
| Lime, lb | 7 |
| DURATONE ® HT, lb | 6 |
| Calcium chloride, lb | 21.8 |
| BAROID ®, lb | 332.3 |
| DEEP-TREAT ™, lb | 3.5 |

Mixed 15 minutes at 7000 rpm on a Silverson L4RT before testing; mixed 10 minutes after rolling

| | | | | | | | | | |
|---|---|---|---|---|---|---|---|---|---|
| Rev Dust, lb | — | | — | | 45 | | — | | |
| 15% NaCl Brine Added, % vol | | | — | | — | | 33 | | |
| Hot rolled @250° F., hr | — | | — | | 16 | | 16 | | 16 |
| Temperature, ° F. | 120 | 40 | 120 | 40 | 120 | 40 | 120 | 40 | 120 |
| Plastic viscosity, cP | 23 | 94 | 22 | 77 | 23 | 82 | 32 | 87 | 35 |
| Yield point, lb/100 ft$^2$ | 12 | 51 | 9 | 18 | 6 | 12 | 5 | 14 | 4 |
| 10 Sec gel, lb/100 ft$^2$ | 6 | 17 | 6 | 9 | 5 | 8 | 5 | 7 | 5 |
| 10 Min gel, lb/100 ft$^2$ | 9 | 21 | 8 | 15 | 7 | 15 | 8 | 10 | 6 |
| Electrical stability, v | 737 | | 676 | | 474 | | 545 | | 230 |
| HTHP filtrate @250° F., ml | | | 4.4 | | 2.0 | | 10.0 | | 12.0 - 1.1 emul. |

TABLE 3-continued

PETROFREE ® LE
14 lb/gal; 75/25 OWR with 250,000 ppm WPS

| Fann 35 dial readings | | | | | | | | | |
|---|---|---|---|---|---|---|---|---|---|
| 600 rpm | 58 | 239 | 53 | 172 | 52 | 176 | 69 | 188 | 74 |
| 300 rpm | 35 | 145 | 31 | 95 | 29 | 94 | 37 | 101 | 39 |
| 200 rpm | 26 | 108 | 24 | 67 | 22 | 66 | 28 | 70 | 29 |
| 100 rpm | 17 | 66 | 16 | 38 | 13 | 37 | 17 | 38 | 17 |
| 6 rpm | 6 | 19 | 5 | 9 | 4 | 8 | 4 | 7 | 5 |
| 3 rpm | 5 | 17 | 4 | 8 | 3 | 7 | 3 | 6 | 4 |

Note: O/S indicates an off-scale reading, or >300. Contaminated samples were made up with mud already hot rolled 16 hr @250° F.

TABLE 4

PETROFREE ® LE
14 lb/gal; 75/25 OWR with 250,000 ppm WPS

| Sample Mark | B2 |
|---|---|
| LE BASE, bbl | 0.5163 |
| Freshwater, bbl | 0.1796 |
| GELTONE ® II, lb | 3 |
| SUSPENTONE ™, lb | 2 |
| BDF-258, lb | 3 |
| Lime, lb | 7 |
| DURATONE ® HT, lb | 6 |
| Calcium chloride, lb | 21.8 |
| BAROID ®, lb | 333.2 |
| DEEP-TREAT ™, lb | 3.3 |

Mixed 15 minutes at 7000 rpm on a Silverson L4RT before testing; mixed 10 minutes after rolling

| | | | | | | | | | |
|---|---|---|---|---|---|---|---|---|---|
| Rev Dust, lb | | — | | — | | 45 | | — | |
| 15% NaCl Brine Added, % vol | | | | | | — | | 33 | |
| Hot rolled @250° F., hr | | — | | — | 16 | | 16 | | 16 |
| Temperature, ° F. | 120 | 40 | 120 | 40 | 120 | 40 | 120 | 40 | 120 |
| Plastic viscosity, cP | 26 | 72 | 23 | 64 | 23 | 98 | 34 | 96 | 36 |
| Yield point, lb/100 ft² | 12 | 29 | 9 | 16 | 7 | 26 | 6 | 32 | 11 |
| 10 Sec gel, lb/100 ft² | 7 | 14 | 6 | 12 | 6 | 13 | 6 | 16 | 10 |
| 10 Min gel, lb/100 ft² | 9 | 18 | 8 | 16 | 9 | 28 | 8 | 21 | 9 |
| Electrical stability, v | 554 | | 615 | | 568 | | 574 | | 269 |
| HTHP filtrate @250° F., ml | | | 2.2 | | 2.2 | | 3.0 | | 1.8 |
| Fann 35 dial readings | | | | | | | | | |
| 600 rpm | 64 | 173 | 55 | 144 | 53 | 222 | 74 | 224 | 83 |
| 300 rpm | 38 | 101 | 32 | 80 | 30 | 124 | 40 | 128 | 47 |
| 200 rpm | 29 | 75 | 25 | 58 | 23 | 89 | 29 | 94 | 36 |
| 100 rpm | 20 | 47 | 17 | 35 | 15 | 52 | 18 | 58 | 23 |
| 6 rpm | 7 | 15 | 6 | 10 | 6 | 13 | 4 | 16 | 8 |
| 3 rpm | 6 | 14 | 5 | 9 | 5 | 11 | 3 | 14 | 7 |

Note: O/S indicates an off-scale reading, or >300. Contaminated samples were made up with mud already hot rolled 16 hr @250° F.

TABLE 5

PETROFREE ® SF
14 lb/gal; 75/25 OWR with 250,000 ppm WPS

| Sample Mark | H2 |
|---|---|
| SF BASE, bbl | 0.516 |
| Freshwater, bbl | 0.181 |
| GELTONE ® II, lb | 3 |
| SUSPENTONE ™, lb | 1 |
| BDF-258, lb | 3 |
| Lime, lb | 8 |
| DURATONE ® HT, lb | 7 |
| BAROID ®, lb | 330 |
| Calcium chloride, lb | 21.9 |

TABLE 5-continued

PETROFREE ® SF
14 lb/gal; 75/25 OWR with 250,000 ppm WPS

| | | | | | | | | | |
|---|---|---|---|---|---|---|---|---|---|
| DEEP-TREAT ™, lb | | | | | 3 | | | | |
| DRILTREAT ®, lb | | | | | 1 | | | | |

Mixed 15 minutes at 7000 rpm on a Silverson L4RT before testing; mixed 10 minutes after rolling

| | | | | | | | | | |
|---|---|---|---|---|---|---|---|---|---|
| Rev Dust, lb | — | | | | | | 45 | | — |
| 15% NaCl Brine Added, % vol | | | | | | | — | | 33 |
| Hot rolled @250° F., hr | — | | — | | 16 | | 16 | | 16 |

| | | | | | | | | | |
|---|---|---|---|---|---|---|---|---|---|
| Temperature, ° F. | 120 | 40 | 120 | 40 | 120 | 40 | 120 | 40 | 120 |
| Plastic viscosity, cP | 28 | 82 | 25 | 86 | 25 | N/A | 46 | 116 | 41 |
| Yield point, lb/100 ft² | 14 | 36 | 16 | 29 | 14 | N/A | 22 | 45 | 22 |
| 10 Sec gel, lb/100 ft² | 7 | 17 | 7 | 14 | 8 | 28 | 18 | 19 | 12 |
| 10 Min gel, lb/100 ft² | 10 | 20 | 9 | 18 | 10 | 60 | 31 | 21 | 12 |
| Electrical stability, v | 603 | 694 | | 684 | | 846 | | 409 | |
| HTHP filtrate @250° F., ml | | 1.2 | | 1.6 | | 4.0 | | 1.6 | |
| Fann 35 dial readings | | | | | | | | | |
| 600 rpm | 70 | 200 | 66 | 201 | 64 | O/S | 114 | 277 | 104 |
| 300 rpm | 42 | 118 | 41 | 115 | 39 | 201 | 68 | 161 | 63 |
| 200 rpm | 33 | 89 | 32 | 84 | 30 | 149 | 52 | 119 | 48 |
| 100 rpm | 22 | 57 | 22 | 51 | 21 | 93 | 34 | 74 | 33 |
| 6 rpm | 8 | 19 | 8 | 15 | 8 | 28 | 13 | 22 | 13 |
| 3 rpm | 7 | 17 | 7 | 14 | 7 | 24 | 12 | 19 | 12 |

Note:
O/S indicates an off-scale reading, or >300. Contaminated samples were made up with mud already rolled 16 hr @250° F.

TABLE 6

PETROFREE ® SF
14 lb/gal; 75/25 OWR with 250,000 ppm WPS
NO DURATONE ® HT

| Sample Mark | O |
|---|---|
| SF BASE, lb | 0.516 |
| Freshwater, bbl | 0.181 |
| GELTONE ® II, lb | 4 |
| SUSPENTONE ™, lb | 1 |
| BDF-258, lb | 3 |
| Lime, lb | 9 |
| Calcium chloride, lb | 21.9 |
| BAROID ®, lb | 330 |
| DRILTREAT ®, lb | 1 |
| DEEP-TREAT ™, lb | 3 |

Mixed 15 minutes at 7000 rpm on a Silverson L4RT before testing; mixed 10 minutes after rolling

| | | | | | | | | | |
|---|---|---|---|---|---|---|---|---|---|
| Hot rolled @250° F., hr | — | | — | | 16 | | 16 | | 16 |
| Rev Dust, lb | — | | — | | — | | 45 | | — |
| 15% NaCl brine, % vol | | | | | — | | — | | 33 |

| | | | | | | | | | |
|---|---|---|---|---|---|---|---|---|---|
| Temperature, ° F. | 120 | 40 | 120 | 40 | 120 | 40 | 120 | 40 | 120 |
| Plastic viscosity, cP | 28 | 88 | 33 | 85 | 29 | N/A | 50 | N/A | 69 |
| Yield point, lb/100 ft² | 5 | 19 | 8 | 20 | 8 | N/A | 5 | N/A | 45 |
| 10 Sec gel, lb/100 ft² | 5 | 10 | 7 | 9 | 5 | 5 | 3 | 48 | 25 |
| 10 Min gel, lb/100 ft² | 8 | 14 | 9 | 13 | 7 | 14 | 10 | >60 | 62 |
| Electrical stability @120° F., v | 471 | 519 | | 496/230 | | 218 | | 285 | |
| HTHP filtrate @250° F., ml | | 0.2 | | 1.6 | | 4.0 | | 3.4–0.4 H₂O | |
| Fann 35 dial readings | | | | | | | | | |
| 600 rpm | 61 | 195 | 74 | 190 | 66 | O/S | 105 | O/S | 183 |
| 300 rpm | 33 | 107 | 41 | 105 | 37 | 173 | 55 | O/S | 114 |
| 200 rpm | 25 | 75 | 31 | 75 | 27 | 123 | 39 | 256 | 87 |
| 100 rpm | 16 | 43 | 20 | 44 | 17 | 68 | 21 | 163 | 57 |
| 6 rpm | 5 | 10 | 7 | 10 | 5 | 7 | 3 | 45 | 26 |
| 3 rpm | 4 | 8 | 6 | 8 | 4 | 5 | 2 | 40 | 24 |

Note:
O/S indicates an off-scale reading, or >300. Contaminated samples were made up with mud already rolled 16 hr @250° F.

TABLE 7

INVERMUL ®
14 lb/gal; 250,000 WPS

| Sample Mark | 1 | 2 | 3 | | 4 | | 5 | |
|---|---|---|---|---|---|---|---|---|
| Diesel, bbl | 0.5395 | 0.5234 | 0.5679 | | 0.5743 | | 0.5608 | |
| Fresh water, bbl | 0.1814 | 0.1815 | 0.1449 | | 0.1453 | | 0.1454 | |
| Oil-to-Water Ratio | 75/25 | 75/25 | 80/20 | | 80/20 | | 80/20 | |
| GELTONE ® II, lb | 2 | 2 | 2 | | 2 | | 2 | |
| SUSPENTONE ™, lb | 1 | 1 | — | | — | | — | |
| BDF-258, lb | 3.5 | — | 6 | | 3 | | — | |
| INVERMUL ® NT, lb | — | 3 | — | | — | | 3 | |
| Lime, lb | 8 | 8 | 12 | | 8 | | 8 | |
| DURATONE ® HT, lb | 6 | 6 | 6 | | 6 | | 6 | |
| EZ MUL ® NT, lb | — | 6 | — | | — | | 6 | |
| Calcium chloride, lb | 22.0 | 22.1 | 17.6 | | 17.7 | | 17.7 | |
| BAROID ®, lb | 302 | 301 | 307 | | 310 | | 309 | |
| Rev Dust, lb | 20 | 20 | 20 | | 20 | | 20 | |
| DRILTREAT ®, lb | — | — | — | | 1.5 | | — | |
| Hot rolled @300 ° F., hr | — | — | — | 16 | — | 16 | — | 16 |
| Plastic viscosity @150° F., cP | 25 | 26 | 21 | 23 | 22 | 19 | 20 | 22 |
| Yield point, lb/100 ft² | 31 | 53 | 17 | 11 | 13 | 9 | 30 | 8 |
| 10 Sec gel, lb/100 ft² | 26 | 32 | 12 | 14 | 8 | 8 | 16 | 8 |
| 10 Min gel, lb/100 ft² | 34 | 34 | 23 | 29 | 15 | 16 | 16 | 9 |
| Electrical stability, v | 593 | 1140 | 923 | 1302 | 697 | 783 | 1404 | 766 |
| HTHP filtrate @300° F., ml | 11.6* | 3.8 | 6.2 | 16.4 | 5.6 | 10.0 | 5.4 | 7.6 |
| Fann 35 dial readings | | | | | | | | |
| 600 rpm | 81 | 105 | 59 | 57 | 57 | 47 | 70 | 52 |
| 300 rpm | 56 | 79 | 38 | 34 | 35 | 28 | 50 | 30 |
| 200 rpm | 46 | 69 | 30 | 26 | 28 | 21 | 42 | 23 |
| 100 rpm | 36 | 56 | 22 | 17 | 19 | 14 | 32 | 16 |
| 6 rpm | 21 | 33 | 10 | 8 | 8 | 7 | 17 | 7 |
| 3 rpm | 20 | 32 | 9 | 7 | 7 | 6 | 16 | 6 |

*Trace of water/emulsion was seen in the filtrate.

TABLE 8

INVERMUL ®
14 lb/gal; 80/20 OWR with 250,000 WPS

| Sample Mark | 10 | | 11 | |
|---|---|---|---|---|
| Diesel, bbl | 0.577 | | 0.577 | |
| Fresh water, bbl | 0.145 | | 0.145 | |
| GELTONE ® II, lb | 6 | | 6 | |
| BDF-258, lb | 3 | | 3 | |
| Lime, lb | 8 | | 8 | |
| Calcium chloride, lb | 17.6 | | 17.6 | |
| DEEP-TREAT ™, lb | 1.5 | | 1 | |
| BAROID ®, lb | 312 | | 312 | |
| Rev Dust, lb | 20 | | 20 | |
| DRILTREAT ®, lb | — | | 1 | |
| Hot rolled @ 150° F., hr | 16 | — | 16 | — |
| Hot rolled @ 250° F., hr | — | 16 | — | 16 |
| Plastic viscosity @ 150° F., cP | 23 | 24 | 23 | 24 |
| Yield point, lb/100 ft² | 28 | 10 | 25 | 12 |
| 10 Sec gel, lb/100 ft² | 17 | 10 | 18 | 11 |
| 10 Min gel, lb/100 ft² | 22 | 16 | 20 | 20 |
| Electrical stability, v | 686 | 783 | 561 | 723 |
| HTHP filtrate @ 250° F., ml | 5.6 | 6.8 | 6.6 | 9.4 |
| HTHP filt.cake thickness, ¹⁄₃₂" | 4 | 3 | 5 | 5 |
| Fann 35 dial readings | | | | |
| 600 rpm | 74 | 58 | 71 | 60 |
| 300 rpm | 51 | 34 | 48 | 36 |
| 200 rpm | 42 | 26 | 39 | 28 |
| 100 rpm | 32 | 17 | 30 | 19 |
| 6 rpm | 17 | 7 | 17 | 8 |
| 3 rpm | 16 | 6 | 17 | 8 |

Note:
0.4 lb/bbl DEEP-TREAT ™ was sufficient to wet in the barite and Rev Dust in mud 11. Additional product was added after the Rev Dust to total 1 lb/bbl.

TABLE 9

PETROFREE ® SF
14 lb/gal; 75/25 OWR with 250,000 ppm WPS
NO DURATONE ® HT

| Sample Mark | I |
|---|---|
| SF BASE, bbl | 0.516 |
| Freshwater, bbl | 0.181 |
| GELTONE ® II, lb | 4 |
| SUSPENTONE ™, lb | 1 |
| BDF-258, lb | 3.5 |
| Lime, lb | 9 |
| DURATONE ® HT, lb | — |

TABLE 9-continued

PETROFREE ® SF
14 lb/gal; 75/25 OWR with 250,000 ppm WPS
NO DURATONE ® HT

| | |
|---|---|
| Calcium chloride, lb | 21.9 |
| DEEP-TREAT ™, lb | 3 |
| BAROID ®, lb | 330 |

Mixed 15 minutes at 7000 rpm on a Silverson L4RT before testing; mixed 10 minutes after rolling

| | | | | | | | | | |
|---|---|---|---|---|---|---|---|---|---|
| Hot rolled @250° F., hr | — | | — | | 16 | | 16 | | 16 |
| Rev Dust, lb | | | — | | | | 45 | | — |
| 15% NaCl Brine Added, % vol | | | | | | | — | | 33 |

| Temperature, ° F. | 120 | 40 | 120 | 40 | 120 | 40 | 120 | 58 | 120 |
|---|---|---|---|---|---|---|---|---|---|
| Plastic viscosity, cP | 29 | 85 | 32 | 76 | 31 | N/A | 54 | N/A | 71 |
| Yield point, lb/100 ft$^2$ | 9 | 17 | 9 | 15 | 6 | N/A | 7 | N/A | 53 |
| 10 Sec gel, lb/100 ft$^2$ | 7 | 10 | 8 | 9 | 7 | 6 | 4 | 55 | 34 |
| 10 Min gel, lb/100 ft$^2$ | 8 | 15 | 11 | 10 | 7 | 13 | 8 | — | 65 |
| Electrical stability, v | 482 | 529 | | 241 | | 234 | | 293 | |
| HTHP filtrate @250° F., ml | | 1.6 | | 2.8* | | 6.0 | | 5.0–1.0 H$_2$O | |
| Fann 35 dial readings | | | | | | | | | |
| 600 rpm | 67 | 187 | 73 | 167 | 68 | O/S | 115 | O/S | 195 |
| 300 rpm | 38 | 102 | 41 | 91 | 37 | 186 | 61 | 278 | 124 |
| 200 rpm | 29 | 73 | 31 | 65 | 28 | 130 | 43 | 220 | 97 |
| 100 rpm | 19 | 42 | 20 | 38 | 18 | 71 | 23 | 151 | 67 |
| 6 rpm | 6 | 10 | 7 | 9 | 6 | 8 | 3 | 53 | 29 |
| 3 rpm | 5 | 8 | 6 | 7 | 5 | 5 | 2 | 50 | 28 |

Note:
O/S indicates an off-scale reading, or >300. Contaminated samples were made up with mud already rolled 16 hr @250° F.
*Some small water droplets were observed in the filtrate

TABLE 10

PETROFREE ® SF
14 lb/gal; 75/25 OWR with 250,000 ppm WPS
NO DURATONE ® HT

| Sample Mark | N |
|---|---|
| SF BASE, lb | 0.516 |
| Freshwater, bbl | 0.181 |
| GELTONE ® II, lb | 4 |
| SUSPENTONE ™, lb | 1 |
| BDF-258, lb | 3.5 |
| Lime, lb | 9 |
| Calcium chloride, lb | 21.9 |
| DEEP-TREAT ™, lb | 4 |
| BAROID ®, lb | 330 |

Mixed 15 minutes at 7000 rpm on a Silverson L4RT before testing; mixed 10 minutes after rolling

| | | | | | | | | | |
|---|---|---|---|---|---|---|---|---|---|
| Hot rolled @250° F., hr | — | | — | | 16 | | 16 | | 16 |
| Rev Dust, lb | | | — | | | | 45 | | — |
| 15% NaCl brine, % vol | | | | | | | — | | 33 |
| DEEP-TREAT ™, lb | | | — | | | | 2 | | 2 |

| Temperature, ° F. | 120 | 40 | 120 | 40 | 120 | 40 | 120 | 40 | 120 |
|---|---|---|---|---|---|---|---|---|---|
| Plastic viscosity, cP | 35 | 103 | 38 | 80 | 31 | 124 | 44 | N/A | 53 |
| Yield point, lb/100 ft$^2$ | 11 | 18 | 11 | 16 | 6 | 22 | 5 | N/A | 10 |
| 10 Sec gel, lb/100 ft$^2$ | 8 | 10 | 7 | 8 | 6 | 5 | 5 | 8 | 6 |
| 10 Min gel, lb/100 ft$^2$ | 14 | 16 | 11 | 9 | 7 | 8 | 7 | 10 | 7 |
| Electrical stability @120° F., v | 503 | 527 | | 209 | | 275 | | 156 | |
| HTHP filtrate @250° F., ml | | 0.6 | | 1.2 | | 1.6 | | 1.0–trace emul | |
| Fann 35 dial readings | | | | | | | | | |
| 600 rpm | 81 | 224 | 87 | 176 | 68 | 270 | 93 | O/S | 116 |
| 300 rpm | 46 | 121 | 49 | 96 | 37 | 146 | 49 | 189 | 63 |
| 200 rpm | 35 | 85 | 37 | 68 | 29 | 101 | 35 | 134 | 44 |
| 100 rpm | 22 | 49 | 24 | 39 | 18 | 55 | 20 | 74 | 25 |
| 6 rpm | 7 | 10 | 7 | 8 | 6 | 6 | 4 | 10 | 5 |
| 3 rpm | 6 | 8 | 6 | 7 | 5 | 4 | 3 | 7 | 4 |

Note:
O/S indicates an off-scale reading, or >300. Contaminated samples were made up with mud already rolled 16 hr @250° F.

TABLE 11

| PETROFREE ® SF 14 lb/gal; 75/25 OWR with 250,000 ppm WPS | | | | | | | | | |
|---|---|---|---|---|---|---|---|---|---|
| Sample Mark | | | | | BB | | | | |
| SF BASE, lb | | | | | 0.516 | | | | |
| Freshwater, bbl | | | | | 0.181 | | | | |
| GELTONE ® II, lb | | | | | 4 | | | | |
| SUSPENTONE ™, lb | | | | | 1 | | | | |
| BDF-258, lb | | | | | 3.5 | | | | |
| Lime, lb | | | | | 9 | | | | |
| Calcium chloride, lb | | | | | 21.9 | | | | |
| BD QUAT 2HT, lb | | | | | 1 | | | | |
| BAROID ®, lb | | | | | 330 | | | | |
| DEEP-TREAT ™, lb | | | | | 3 | | | | |

Mixed 15 minutes at 7000 rpm on a Silverson L4RT before testing; mixed 10 minutes after rolling

| | | | | | | | | | |
|---|---|---|---|---|---|---|---|---|---|
| Hot rolled @250° F., hr | — | — | 16 | | 16 | | 16 | | |
| Rev Dust, lb | — | — | — | | 45 | | — | | |
| 15% NaCl brine, % vol | — | — | — | | — | | 25 | | |
| Temperature, ° F. | 120 | 40 | 120 | 40 | 120 | 40 | 120 | 40 | 120 |
| Plastic viscosity, cP | 29 | 76 | 30 | 75 | 28 | 119 | 40 | 119 | 43 |
| Yield point, lb/100 ft$^2$ | 15 | 32 | 17 | 24 | 10 | 16 | 6 | 35 | 14 |
| 10 Sec gel, lb/100 ft$^2$ | 8 | 14 | 8 | 11 | 7 | 7 | 5 | 15 | 8 |
| 10 Min gel, lb/100 ft$^2$ | 13 | 17 | 9 | 12 | 8 | 11 | 10 | 15 | 9 |
| Electrical stability @120° F., v | 633 | *486 average | | 333 | | 576 | | 223 | |
| HTHP filtrate @250° F., ml | | 2.2 | | 5.4 | | 4.0 | | 3.0–0.2 emul. | |
| Fann 35 dial readings | | | | | | | | | |
| 600 rpm | 73 | 184 | 77 | 174 | 66 | 254 | 86 | 273 | 100 |
| 300 rpm | 44 | 108 | 47 | 99 | 38 | 135 | 46 | 154 | 57 |
| 200 rpm | 34 | 81 | 36 | 73 | 30 | 93 | 33 | 111 | 42 |
| 100 rpm | 23 | 52 | 24 | 45 | 19 | 50 | 19 | 65 | 26 |
| 6 rpm | 8 | 16 | 8 | 13 | 7 | 7 | 4 | 15 | 8 |
| 3 rpm | 7 | 14 | 7 | 11 | 6 | 5 | 3 | 13 | 7 |

Note: Contaminated samples were made up with mud already hot rolled 16 hr.@250° F.
*ES readings ranged from 347 to 656 volts.

TABLE 12

| BDF-257 and BDF-258 Summary PETROFREE SF: 14 lb/gal; 75/25 OWR with 250,000 ppm WPS | | | | | | | | | | | | | | | |
|---|---|---|---|---|---|---|---|---|---|---|---|---|---|---|---|
| Sample Mark | A | | | B | | | C | | | D | | | E | | |
| SF BASE, bbl | 0.516 | | | 0.516 | | | 0.516 | | | 0.516 | | | 0.516 | | |
| Freshwater, bbl | 0.181 | | | 0.181 | | | 0.181 | | | 0.181 | | | 0.181 | | |
| GELTONE II, lb | 3 | | | 3 | | | 3 | | | 3 | | | 3 | | |
| SUSPENTONE, lb | 1 | | | 1 | | | 1 | | | 1 | | | 1 | | |
| LE MUL, lb | 4 | | | — | | | — | | | — | | | — | | |
| BDF-257, lb | — | | | 3.5 | | | 4.9 | | | 7 | | | — | | |
| BDF-258, lb | — | | | — | | | — | | | — | | | 3 | | |
| LE SUPERMUL, lb | 6 | | | 4.8 | | | 2.9 | | | — | | | — | | |
| Lime, lb | 5 | | | 5 | | | 5 | | | 18 | | | 8 | | |
| DURATONE HT, lb | 7 | | | 7 | | | 7 | | | 7 | | | 7 | | |
| BAROID ®, lb | 330 | | | 330 | | | 330 | | | 330 | | | 330 | | |
| Calcium chloride, lb | 21.9 | | | 21.9 | | | 21.9 | | | 21.9 | | | 21.9 | | |
| DEEP-TREAT, lb | 3 | | | 3 | | | 3 | | | 6 | | | 3 | | |

Mixed 15 minutes on a Silverson L4RT at 7000 rpm & Hot Rolled for 16 hours at 150° F. Before Testing

| | | | | | | | | | | | | | | | |
|---|---|---|---|---|---|---|---|---|---|---|---|---|---|---|---|
| Hot rolled @ 250° F., hrs | — | 16 | | — | 16 | | — | 16 | | — | 16 | | — | 16 | |
| Temperature, ° F. | 120 | 120 | 40 | 120 | 120 | 40 | 120 | 120 | 40 | 120 | 120 | 40 | 120 | 120 | 40 |
| Plastic viscosity, cP | 23 | 24 | 80 | 27 | 27 | 91 | 35 | 33 | 113 | 33 | 42 | 129 | 27 | 26 | 72 |
| Yield point, lb/100 ft$^2$ | 15 | 8 | 18 | 14 | 8 | 31 | 15 | 11 | 42 | 21 | 14 | 42 | 14 | 12 | 24 |
| 10 Sec gel, lb/100 ft$^2$ | 8 | 6 | 7 | 8 | 6 | 9 | 9 | 7 | 23 | 14 | 10 | 22 | 7 | 7 | 13 |
| 10 Min gel, lb/100 ft$^2$ | 9 | 8 | 11 | 10 | 7 | 14 | 13 | 12 | 56 | 21 | 17 | 34 | 9 | 9 | 15 |
| Electrical stability, v | 690 | 235 | — | 680 | 284 | — | 650 | 262 | — | 765 | 320 | — | 669 | 630 | — |
| HTHP filtrate @ 250° F., ml | 2.4 | 2.4 | | 1.6 | 3.6 | | 1.2 | 2.0 | | 0.6 | 0.0 | | 2.0 | 1.6 | |
| Fann 35 dial readings | | | | | | | | | | | | | | | |
| 600 rpm | 61 | 56 | 178 | 68 | 62 | 213 | 85 | 77 | 268 | 87 | 98 | 300 | 68 | 64 | 168 |
| 300 rpm | 38 | 32 | 98 | 41 | 35 | 122 | 50 | 44 | 155 | 54 | 56 | 171 | 41 | 38 | 96 |
| 200 rpm | 29 | 24 | 69 | 32 | 26 | 87 | 38 | 33 | 113 | 42 | 44 | 123 | 32 | 30 | 72 |
| 100 rpm | 20 | 15 | 38 | 22 | 17 | 50 | 25 | 21 | 68 | 29 | 29 | 74 | 22 | 20 | 45 |
| 6 rpm | 7 | 5 | 7 | 8 | 6 | 10 | 9 | 7 | 19 | 13 | 10 | 20 | 8 | 8 | 14 |
| 3 rpm | 6 | 4 | 6 | 7 | 5 | 8 | 8 | 6 | 17 | 12 | 9 | 17 | 7 | 7 | 12 |

TABLE 13

Summary of Contamination Results
PETROFREE SF: 14 lb/gal; 75/25 OWR with 250,000 ppm WPS

| Sample Mark | A | | | B | | | C | | | D | | | E | | |
|---|---|---|---|---|---|---|---|---|---|---|---|---|---|---|---|
| SF BASE, bbl | 0.516 | | | 0.516 | | | 0.516 | | | 0.516 | | | 0.516 | | |
| Freshwater, bbl | 0.181 | | | 0.181 | | | 0.181 | | | 0.181 | | | 0.181 | | |
| GELTONE II, lb | 3 | | | 3 | | | 3 | | | 3 | | | 3 | | |
| SUSPENTONE, lb | 1 | | | 1 | | | 1 | | | 1 | | | 1 | | |
| LE MUL, lb | 4 | | | — | | | — | | | — | | | — | | |
| BDF-257, lb | — | | | 3.5 | | | 4.9 | | | 7 | | | — | | |
| BDF-258, lb | — | | | — | | | — | | | — | | | 3 | | |
| LE SUPERMUL, lb | 6 | | | 4.8 | | | 2.9 | | | — | | | — | | |
| Lime, lb | 5 | | | 5 | | | 5 | | | 18 | | | 8 | | |
| DURATONE HT, lb | 7 | | | 7 | | | 7 | | | 7 | | | 7 | | |
| BAROID ®, lb | 330 | | | 330 | | | 330 | | | 330 | | | 330 | | |
| Calcium chloride, lb | 21.9 | | | 21.9 | | | 21.9 | | | 21.9 | | | 21.9 | | |
| DEEP-TREAT, lb | 3 | | | 3 | | | 3 | | | 6 | | | 3 | | |
| *Base mud (HR @ 250° F.), bbl | 1.0 | 0.8 | | 1.0 | 0.8 | | 1.0 | 0.8 | | 1.0 | 0.8 | | 1.0 | 0.8 | |
| Rev Dust, lb | 45 | — | | 45 | — | | 45 | — | | 45 | — | | 45 | — | |
| 15% wt NaCl brine, bbl | — | 0.2 | | — | 0.2 | | — | 0.2 | | — | 0.2 | | — | 0.2 | |
| Hot rolled @ 250° F., hr | | | | | | | | 16 | | | | | | | |
| Temperature ° F. | 120 | 120 | 40 | 120 | 120 | 40 | 120 | 120 | 40 | 120 | 120 | 40 | 120 | 120 | 40 |
| Plastic viscosity, cP | 37 | 42 | 108 | 34 | 45 | N/A | 55 | 58 | N/A | N/A | 84 | N/A | 49 | 43 | 113 |
| Yield point, lb/100 ft$^2$ | 8 | 7 | 26 | 10 | 12 | N/A | 25 | 37 | N/A | N/A | 53 | N/A | 24 | 20 | 43 |
| 10 Sec gel, lb/100 ft$^2$ | 7 | 6 | 9 | 8 | 6 | 13 | 14 | 16 | 46 | 54 | 27 | 49 | 16 | 13 | 19 |
| 10 Min gel, lb/100 ft$^2$ | 10 | 10 | 12 | 10 | 9 | 18 | 38 | 28 | — | 80 | 37 | 85 | 36 | 13 | 20 |
| Electrical stability, v | 488 | 77 | — | 553 | 116 | — | 575 | 145 | — | 1500 | 150 | — | 884 | 393 | — |
| HTHP filtrate @ 250° F., ml | 10.4 | 7.6 (0.5 H$_2$O) | | 0.6 | 0.6 | | 1.6 | 1.6 | | | 3.8 | 2.2 | | 5.2 | 2.4 | |
| Fann 35 dial readings | | | | | | | | | | | | | | | | |
| 600 rpm | 82 | 87 | 242 | 78 | 102 | O/S | 135 | 153 | O/S | O/S | 221 | O/S | 122 | 106 | 269 |
| 300 rpm | 45 | 49 | 134 | 44 | 57 | 216 | 80 | 95 | 284 | 202 | 137 | 299 | 73 | 63 | 156 |
| 200 rpm | 33 | 36 | 94 | 32 | 41 | 154 | 59 | 72 | 214 | 160 | 105 | 230 | 56 | 48 | 116 |
| 100 rpm | 20 | 23 | 53 | 20 | 25 | 90 | 36 | 47 | 137 | 112 | 70 | 152 | 38 | 32 | 72 |
| 6 rpm | 5 | 7 | 10 | 6 | 6 | 16 | 10 | 15 | 41 | 47 | 25 | 50 | 15 | 12 | 21 |
| 3 rpm | 4 | 6 | 8 | 5 | 5 | 12 | 8 | 13 | 37 | 43 | 15 | 44 | 14 | 11 | 19 |

Note:
O/S indicates an off-scale reading, or >300.
*These contaminated samples were made up with fluid that was previously hot rolled for 16 hours at 250° F.

These experimental results show that the product of the invention has emulsion-forming capabilities comparable to or exceeding prior art emulsifiers at only about one-third the concentration and that the product of the invention improves the electrical stability of the drilling fluid, even after heat stress. These results also show that the product of the invention imparts very low filtration properties to the drilling fluids. Further, the product of the invention provides significantly better filtration control than conventional emulsifiers, even after solids and brine contamination. As demonstrated by the data in the tables above, inclusion of a wetting agent with a carboxylic acid terminated polyamide to comprise Component A may provide significant performance advantages in some drilling fluids at certain temperatures or under certain well conditions. Substitution of a wetting agent for the polyamide in Component A may also yield certain advantages with some drilling fluids in some environments. Carboxylic acid terminated polyamides without wetting agent to comprise Component A may yield superior performance in other drilling fluids and/or in other environments.

Still further, the tests showed that no fluid loss control additives were needed for the same filtration properties as prior art emulsifiers when the product of the invention was used. The tests also indicated that the product of the invention performs well with other emulsifying products, which should allow simpler maintenance treatments in oil or synthetic based fluids when using the product of the invention.

In the method of the invention, the product of the invention is added to an oil or synthetic based drilling fluid or a drilling fluid comprising an invert emulsion to improve or facilitate the emulsification of the oil or synthetic base fluid.

The foregoing description of the invention is intended to be a description of preferred embodiments. Various changes in the details of the described product and method can be made without departing from the intended scope of this invention as defined by the appended claims.

What is claimed is:

1. A drilling fluid comprising a wetting agent and a product produced by the Diels-Alder reaction of dienophiles with a mixture of fatty acids and resin acids.

2. The drilling fluid of claim 1 wherein said drilling fluid is oil or synthetic based.

3. The drilling fluid of claim 1 wherein said dienophiles are selected from the group consisting of carboxylic acids, polycarboxylic acids, acid anhydrides, and mixes thereof.

4. The drilling fluid of claim 1 wherein said mixture of fatty acids and resin acids are derived from the distillation of tall oil.

5. The drilling fluid of claim 1 wherein said dienophiles are maleic anhydrides.

6. The drilling fluid of claim 1 wherein said mixture has a ratio of fatty acids to resins acids ranging from about 4:1 to about 1:1.

7. The drilling fluid of claim 1 wherein said mixture has a ratio of fatty acids to resin acids of about 2:1.

8. The drilling fluid of claim 1 wherein the ratio of wetting agent to said mixture is about 1:5 to about 1:1.

9. The drilling fluid of claim 1 wherein the ratio of said wetting agent to said mixture is about 1:2 to about 1:3.

10. The drilling fluid of claim 1 wherein said product is saponified.

11. The drilling fluid of claim 10 wherein said saponification is effected with calcium chloride, lime, quicklime, or other sources of calcium cations.

12. The drilling fluid of claim 10 wherein said saponification occurs in situ.

13. The drilling fluid of claim 10 wherein said saponification occurs before said blend is added to said drilling fluid.

14. The drilling fluid of claim 1 further comprising lime, calcium chlorides, quicklime, or other saponifying agents.

15. The drilling fluid of claim 1 further comprising carboxylic acid-terminated polyamide in said blend.

16. The drilling fluid of claim 1 wherein said wetting agent and product provide filtration control.

17. The drilling fluid of claim 1 wherein said wetting agent and product provide emulsification.

18. The drilling fluid of claim 1 wherein said wetting agent and product provide electrical stability.

19. An emulsifier comprising a wetting agent and a product produced by the Diels-Alder reaction of dienophiles selected from the group consisting of carboxylic acids, polycarboxylic acids, and acid anhydrides, and combinations or mixes thereof, with a mixture of fatty acids and resin acids derived from the distillation of crude tall oil, wherein said mixture comprises a ratio of fatty acids to resin acids ranging from about 4:1 to about 1:1, and wherein the ratio of said wetting agent to said product ranges from about 1:5 to about 1:1.

20. The emulsifier of claim 19 wherein said product is saponified.

21. The emulsifier of claim 20 wherein said saponification is effected by reaction of said product with calcium cations.

22. An additive for improving the properties of an invert emulsion comprising water or brine in an oil or synthetic based drilling fluid for use in drilling a borehole in a subterranean formation, said additive comprising a wetting agent and a product produced by the Diels-Alder reaction of dienophiles, selected from compounds or reagents selected from the group consisting of carboxylic acids, polycarboxylic acids, acid anhydrides, and combinations or mixes thereof, with a mixture of fatty acids and resin acids derived from the distillation of crude tall oil, wherein said acid mixture comprises a ratio of fatty acids to resin acids ranging from about 4:1 to about 1:1, and wherein the ratio of said wetting agent to said product ranges from about 1:5 to about 1:1.

23. The additive of claim 22 wherein said additive is saponified.

24. The additive of claim 23 wherein said properties comprise emulsification.

25. The additive of claim 23 wherein said properties comprise filtration control.

26. The additive of claim 23 further comprising carboxylic acid-terminated polyamide.

27. The additive of claim 23 wherein said properties comprise electrical stability.

28. A method for drilling a borehole in a subterranean formation, said method comprising employing an oil or synthetic based drilling fluid comprising an invert emulsion and an additive comprising a wetting agent and a product produced by the Diels-Alder reaction of compounds or reagents with a mixture of fatty acids and resin acids wherein said compounds or reagents are selected from the group consisting of carboxylic acids, polycarboxylic acids, acid anhydrides and combinations or mixes thereof.

29. The method of claim 28 wherein said mixture is comprised of fatty acids and resin acids derived from the distillation of tall oil.

30. The method of claim 28 wherein said mixture has a ratio of fatty acids to resin acids ranging from about 4:1 to about 1:1.

31. The method of claim 28 wherein said mixture has a ratio of fatty acids to resin acids of about 2:1.

32. The method of claim 28 wherein the ratio of said wetting agent to said product is about 1:5 to about 1:1.

33. The method of claim 28 wherein the ratio of said wetting agent to said product is about 1:2 to about 1:3.

34. The method of claim 28 wherein said product is saponified.

35. The method of claim 34 wherein said product is saponified with calcium chloride, lime, quicklime, or other sources of calcium cations.

36. The method of claim 34 wherein said saponification occurs in situ.

37. The method of claim 34 wherein said saponification occurs before said product is added to said drilling fluid.

38. The method of claim 28 wherein said product is added to said drilling fluid in the borehole.

39. The method of claim 28 wherein said wetting agent and said product is added to said drilling fluid in the borehole.

40. The method of claim 28 wherein said product is added to said drilling fluid at the well surface.

41. The method of claim 28 wherein said wetting agent is added to said drilling fluid at the well surface.

42. The method of claim 28 wherein said product is added to said drilling fluid when the drilling fluid is prepared.

43. The method of claim 28 wherein said wetting agent is added to said drilling fluid when the drilling fluid is prepared.

44. The method of claim 28 wherein said wetting agent and said product are blended together before addition to the drilling fluid.

45. The method of claim 28 wherein said drilling comprises at least one step selected from the group consisting of:
   drilling a borehole in a subterranean formation;
   completing a borehole in a subterranean formation;
   testing a borehole in a subterranean formation;
   servicing a borehole in a subterranean formation; and
   producing fluid from a borehole in a subterranean formation.

46. The method of claim 28 wherein said drilling comprises drilling a borehole in a subterranean formation, completing said borehole, and producing fluid from said borehole.

47. A method for improving or facilitating the emulsification of a drilling fluid, said method comprising adding to said drilling fluid a wetting agent and a product produced by the Diels-Alder reaction of dienophiles with a mixture of fatty acids and resin acids.

48. The method of claim 47 wherein the wetting agent and the product are blended together before addition to the drilling fluid.

49. The method of claim 47 wherein said dienophiles are selected from the group consisting of carboxylic acids, polycarboxylic acids, acid anhydrides, and combinations or mixes thereof.

50. The method of claim 47 further comprising adding carboxylic acid terminated polyamide.

51. A method for improving the filtration properties of an oil or synthetic based drilling fluid or a drilling fluid comprising an invert emulsion, said method employing adding to said drilling fluid a wetting agent and a product produced by the Diels-Alder reaction of dienophiles with a mixture of fatty acids and resin acids.

52. The method of claim 51 wherein said wetting agent and said product were blended in situ the drilling fluid.

53. The method of claim 51 wherein said dienophiles are selected from the group consisting of carboxylic acids, polycarboxylic acids, acid anhydrides, and combinations or mixes thereof.

54. A method for improving the electrical stability of an oil or synthetic based drilling fluid, or a drilling fluid comprising an invert emulsion, said method comprising adding to said fluid a wetting agent and a product produced by the Diels-Alder reaction of dienophiles with a mixture of fatty acids and resin acids.

55. The method of claim 54 wherein said dienophiles are selected from the group consisting of carboxylic acids, polycarboxylic acids, acid anhydrides, and combinations or mixes thereof.

56. A method for drilling a borehole in a subterranean formation employing a drilling fluid, said method comprising adding to said fluid a carboxylic acid terminated polyamide and a product produced by the Diels-Alder reaction of compounds or reagents with a mixture of fatty acids and resin acids wherein said compounds or reagents are selected form the group consisting of carboxylic acids, polycarboxylic acids, acid anhydrides and combinations or mixes thereof.

57. The method of claim 56 wherein said polyamide is added to said drilling fluid in the borehole.

58. The method of claim 56 wherein said product is added to said drilling fluid in the borehole.

59. The method of claim 56 wherein said polyamide and said product are blended in the drilling fluid in the borehole.

60. The method of claim 56 wherein said polyamide is added to said drilling fluid at the well surface.

61. The method of claim 56 wherein said product is added to said drilling fluid at the well surface.

62. The method of claim 56 wherein said polyamide is added to said drilling fluid when the drilling fluid is prepared.

63. The method of claim 56 wherein said product is added to said drilling fluid when the drilling fluid is prepared.

64. The method of claim 56 wherein said polyamide and said product are blended together before addition to the drilling fluid.

65. The method of claim 56 wherein said fluid further comprises a wetting agent.

66. The method of claim 56 wherein said drilling comprises drilling a borehole in a subterranean formation, completing said borehole, and producing fluid from said borehole.

* * * * *